United States Patent Office 3,298,782
Patented Jan. 17, 1967

3,298,782
PURIFICATION OF PHOSPHORIC ACID
Jacques Olivier Archambault, Montreal, Quebec, Canada, assignor to Canadian Industries Limited, Montreal, Quebec, Canada, a corporation of Canada
No Drawing. Filed May 16, 1963, Ser. No. 281,065
Claims priority, application Canada, May 24, 1962, 849,934
5 Claims. (Cl. 23—165)

This invention relates to the extraction of phosphoric acid from its aqueous solutions and, more particularly, to the purification of wet-process phosphoric acid by a solvent extraction method.

Wet-process phosphoric acid is a well-known article of commerce and is produced by the digestion of phosphate rock with sulphuric acid. It is not normally possible to use sulphuric acid of a strength greater than that which will yield a phosphoric acid containing about 30% by weight of $P_2O_5$, since with more concentrated acid the precipitated calcium sulphate becomes more difficult to filter. The impurities present in the resulting wet-process phosphoric acid depend upon the source of the phosphate rock used, but generally include sulphates, fluorine derivatives, silicates and iron and aluminum salts.

It is known that phosphoric acid can be extracted from its aqueous solutions by contact with an immiscible alcohol. It has now been discovered that this extraction can be made very much more efficient, and thus commercially attractive, by the addition to the alcohol of a minor amount of a water-insoluble amine.

It is thus an object of this invention to provide an improved process for extracting phosphoric acid from aqueous solutions thereof. Another object is to provide a process for the purification of impure phosphoric acid solutions, particularly wet-process phosphoric acid. A further object is to prepare phosphates from wet-process acid without an expensive acid concentration step. Additional objects will appear hereinafter.

The process of this invention broadly comprises contacting an aqueous solution of phosphoric acid with a mixture of a minor amount of a water-insoluble amine and a major amount of an aliphatic alcohol having from 4 to 12 carbon atoms.

More particularly, the process of this invention comprises contacting an impure aqueous phosphoric acid with a mixture of a minor amount of a water-soluble amine and a major amount of an aliphatic alcohol having from 4 to 12 carbon atoms per molecule, separating the alcohol-amine phase with the major portion of the phosphoric acid solubilized therein, and recovering purified phosphoric acid from said alcohol-amine phase.

The alcohols used in the process are monohydric aliphatic alcohols, and, as stated hereinbefore, have from 4 to 12 carbon atoms per molecule. They may have straight or branched hydrocarbon chains and may be primary, secondary or tertiary alcohols. Suitable alcohols include n-butanol, secondary butyl alcohol, amyl alcohol, n-hexanol, 1,1-dimethyl hexanol, nonanol, decanol and dodecanol.

The amines suitable for the process are of sufficiently high molecular weight to be essentially water insoluble. Thus while primary, secondary or tertiary amines are effective in assisting the solubilization of the phosphoric acid in the alcohol phase, it is preferred to use secondary or tertiary amines having a total of from 10 to 36 carbon atoms per molecule or primary amines having at least 14 carbon atoms. In this manner the loss of amine to the aqueous layer is minimized. Suitable amines thus include octadecylamine, methyl dioctylamine, dinonylamine, dilauryl butylamine, trilaurylamine and trinonylamine, and they may be used in any amount from an effective trace up to an equal weight with the alcohol. It is preferred, however, to use the amine in an amount of from 5% to 20% by weight of the alcohol.

The contacting of the phosphoric acid solution with the immiscible alcohol-amine solution may be effected batchwise by stirring the two materials together, in which case the alcohol-amine phase can be separated by decantation or in a separating funnel. Preferably, however, the contacting is effected by the known continuous counter current extraction method; several forms of this method being described in the book "Liquid-Liquid Extraction" by L. Alders, published by Elsevier in 1955. Useful amounts of the organic mixture for contacting 1 vol. of aqueous acid vary from about $\frac{1}{10}$ vol. for a dilute acid solution to about 20 vols. for a more concentrated solution.

The recovery of the purified phosphoric acid from the alcohol-amine mixture may be effected by any of several methods. If phosphoric acid is the required end-product, then the organic mixture may be treated by back extraction with water. In this manner a purified phosphoric acid is obtained which is of approximately the same concentration in water as the impure acid initially used in the process. If phosphates are the desired end-product, then the organic mixture may be treated directly with the required base, for example ammonia, caustic soda, caustic potash, lime or magnesium hydroxide, or with a salt whose anion is more easily removed from solution than is phosphate, such as a carbonate or a bicarbonate. The base may be added with or without water. In the latter case, the salt separates as crystals and may be filtered off; in the former case, an aqueous solution or slurry of the salt settles out and may be separated by decantation and concentrated by crystallization.

The following examples illustrate the process of this invention, but the latter is in no manner to be restricted to the details shown. Percentages are by weight unless otherwise stated.

*Example 1*

Pure phosphoric acid was used to demonstrate the improved efficiency of the process of this invention over that using an alcohol alone. In Table I are listed the distribution coefficients between the organic and aqueous phases for the extraction of phosphoric acid from its solutions of various initial molar concentrations into n-amyl alcohol, both with and without 10% of trinonylamine.

TABLE I

| Initial Molar Conc. of $H_3PO_4$ in aqueous phase | Temp., °C. | Distribution of Coefficient | |
|---|---|---|---|
| | | n-Amyl al | n-Amyl alcohol + 10% trinonylamine |
| 1 | 23 | 0.05 | 0.48 |
| | 0 | | 0.45 |
| | 60 | | 0.30 |
| 2 | 23 | 0.06 | 0.31 |
| | 0 | | 0.33 |
| | 60 | | 0.25 |
| 3 | 23 | 0.08 | 0.25 |
| | 0 | | 0.27 |
| | 60 | | 0.25 |
| 4 | 23 | 0.12 | 0.27 |
| | 0 | | 0.29 |

In further experiments, it was shown that the improved results with the use of trinonylamine were not due merely to salt formation or association between the amine and the phosphoric acid. In Table II, col. I is the molar conc. of phosphoric acid in the organic layer using both n-amyl alcohol and 10% trinonylamine, col. II is the amount of phosphoric acid that could theoretically be tied up by the amine, col. III is col. I–col. II, and col. IV is the molar concentration of $H_3PO_4$ achieved by the alcohol alone. It will be seen that col. III always exceeds col. IV.

TABLE II

| Initial Molar Conc. of $H_3PO_4$ in aqueous phase | Col. I | Col. II | Col. III | Col. IV |
|---|---|---|---|---|
| 2 | 0.58 | 0.24 | 0.34 | 0.20 |
| 3 | 0.77 | 0.24 | 0.53 | 0.28 |
| 3.5 | 0.98 | 0.24 | 0.74 | 0.34 |
| 4 | 1.20 | 0.24 | 0.96 | 0.61 |

Example 2

In experiments similar to those of Example 1, the following results (Table III) were obtained using 5% of trinonylamine in n-hexyl alcohol at 23° C.

TABLE III

| Molar Conc. of $H_3PO_4$ in aqueous phase | Distribution Coefficient, Org./Aq. | Molar Ratio, Acid/Amine in Org. Phase |
|---|---|---|
| 0.36 | 0.40 | 1.16 |
| 0.83 | 0.23 | 1.54 |
| 1.57 | 0.16 | 2.04 |
| 2.70 | 0.15 | 3.24 |
| 4.43 | 0.18 | 6.25 |
| 6.25 | 0.256 | 13.0 |

Example 3

Two 50 g. lots of a wet-process phosphoric acid containing 29.6% $P_2O_5$ were extracted six times with either a mixture of 71 g. of n-amyl alcohol and 7.4 g. of water, or a mixture of 71 g. of a 10% solution of a commercially available highly branched long chain secondary amine of mol. wt. 350–400 (mostly N-dodecenyl trialkylmethyl amine), in n-amyl alcohol, and 7.4 g. of water. The results of the extractions are shown in Table IV.

TABLE IV

| | Solvent (a) 10% amine in alcohol | | | Solvent (b) amyl alcohol alone | | |
|---|---|---|---|---|---|---|
| | Percent $P_2O_5$ | Percent $H_2O$ | Wt. $P_2O_5$ | Percent $P_2O_5$ | Percent $H_2O$ | Wt. $P_2O_5$ |
| Extract No.: | | | | | | |
| 1 | 5.37 | 7.73 | 4.64 | 5.12 | 7.83 | 4.32 |
| 2 | 3.35 | 9.18 | 2.80 | 2.74 | 7.92 | 2.22 |
| 3 | 2.82 | 10.2 | 2.34 | 1.77 | 7.82 | 1.40 |
| 4 | 2.25 | 11.0 | 1.86 | 1.28 | 7.84 | 1.01 |
| 5 | 1.35 | 10.6 | 1.10 | 0.88 | 8.94 | 0.69 |
| 6 | 0.82 | 10.0 | 0.66 | 0.68 | 8.13 | 0.53 |
| Total $P_2O_5$, g. | | | 13.40 | | | 10.17 |
| Percent $P_2O_5$ extracted | | | 90.6 | | | 68.8 |

Example 4

In an experiment similar to that of Example III, using dilaurylbutyl amine in place of the highly branched secondary amine, the results shown in Table V were obtained.

TABLE V

| | Percent $P_2O_5$ | Wt. of $P_2O_5$ |
|---|---|---|
| Extract No.: | | |
| 1 | 5.68 | 4.91 |
| 2 | 3.49 | 2.90 |
| 3 | 2.65 | 2.18 |
| 4 | 2.20 | 1.80 |
| 5 | 1.68 | 1.33 |
| 6 | 1.09 | 0.88 |
| Total $P_2O_5$, g. | | 14.00 |
| Percent $P_2O_5$ extracted | | 94.7 |

Example 5

An organic acid-containing mixture was prepared from wet-process phosphoric acid by a 6-stage continuous counter-current extraction using the amine-alcohol mixture of Example III. The mixture was back extracted with water in a 3-stage counter-current extraction using a water/feed ratio of ⅓. 86% of the phosphoric acid was back extracted yielding an acid of the following purity.

TABLE VI

| Species | Original Acid, Percent | Organic Mixture, Percent | Water Extract, Percent |
|---|---|---|---|
| $P_2O_5$ | 29.6 | 8.7 | 24.6 |
| $H_2O$ | 51.6 | 9.4 | |
| $SO_3$ | 2.04 | 0.9 | 0.96 |
| F | 1.90 | 0.6 | 0.76 |
| $R_2O_3$ | 2.20 | 0.08 | 0.08 |
| $SiO_2$ | 0.71 | 0 | 0 |

$R_2O_3$ represents mixed metallic oxides, mostly iron and aluminum.

Example 6

The organic acid-containing mixture of Example 5 was stripped with ammonia to obtain directly an equeous slurry of ammonium phosphates. 50 g. of the organic extract were treated with 9 g. of concentrated aqueous ammonia. After an aqueous slurry had settled to the bottom, the organic phase was decanted and shown to contain only 0.52% $P_2O_5$. The aqueous layer was evaporated to dryness under vacuum and the solid analysed 53.2% $P_2O_5$, 16.6% N. Thus approximately 95% of the phosphoric acid in the extract was obtained as a first yield of ammonium phosphates.

Example 7

The organic extract of Example 6 was stripped with $Na_2CO_3$. To 50 g. of the organic extract was added 6.5 g. of $Na_2CO_3$. The mixture was gently warmed and stirred. 6.5 g. of water were added, and a clear lower When the acid concentration in the aqueous layer is reduced below that corresponding to about 20% by wt. of $P_2O_5$, it is in some cases desirable to add a sequestering agent to prevent the precipitation of iron and aluminum salts. Suitable agents are polycarboxylic, hydroxy-carboxylic and amino-carboxylic acids, polyamines and polyphosphates, more specifically oxalic acid, ethylene diamine tetraacetic acid, gluconic, lactic, citric, glycollic and salicylic acids and their sodium salts. A suitable amount of sequestering agent will usually lie between 0.1% and 5% by weight of the aqueous acid.

aqueous phase separated. On cooling to 10° C. the phase crystallized and was separated by filtration. After washing with alcohol it was shown to be $Na_2HPO_4 2H_2O$. The extraction removed 99.5% of the $P_2O_5$.

What we claim is:
1. A process for the purification of an impure aqueous phosphoric acid solution which comprises contacting said solution with an extraction liquid comprising 5% to 20% by weight of a water-insoluble amine and 95% to 80% by weight of an aliphatic monohydric alcohol having from 4 to 12 carbon atoms per molecule to form an aqueous phase and an alcohol-amine phase containing the major portion of the phosphoric acid solubilized therein, separating the alcohol-amine phase from the aqueous phase, and recovering purified phosphoric acid from said alcohol-amine phase.
2. A process according to claim 1 wherein the purified phosphoric acid is recovered from the alcohol-amine phase by back extraction with water.
3. A process according to claim 1 wherein the purified phosphoric acid is recovered from the alcohol-amine phase by reaction with a base.
4. A process according to claim 1 wherein the water-insoluble amine is selected from the group consisting of primary, secondary and tertiary amines having a total of from 10 to 36 carbon atoms per molecule.
5. A process according to claim 1 wherein the phosphoric acid solution is wet-process phosphoric acid.

References Cited by the Examiner

UNITED STATES PATENTS

| | | | |
|---|---|---|---|
| 1,838,431 | 12/1931 | Milligan | 23—165 |
| 1,857,470 | 5/1932 | Milligan et al. | 23—165 |
| 1,929,442 | 10/1933 | Milligan | 23—165 |
| 1,981,145 | 11/1934 | Keller | 23—165 |
| 2,870,207 | 1/1959 | Niederhauser et al. | 23—165 X |
| 2,880,063 | 3/1959 | Baniel et al. | 23—165 |
| 2,885,265 | 5/1959 | Cunningham | 23—165 |
| 2,968,523 | 1/1961 | Cunningham et al. | 23—312 X |
| 3,057,711 | 10/1962 | Reusser et al. | 23—165 X |
| 3,076,701 | 2/1963 | Bersworth et al. | 71—43 |
| 3,082,062 | 3/1963 | Preuss | 23—312 X |
| 3,118,730 | 1/1964 | Nickerson | 23—165 |
| 3,129,170 | 4/1964 | Ittlinger | 210—54 |

OTHER REFERENCES

Coleman et al.: "Amine Salts as Solvent Extraction Reagents for Uranium and Other Metals," Proceedings of International Conference of Peaceful Uses of Atomic Energy, vol. 28, 1958, pages 278–288.

Irving et al.: "Metal Complexes and Partition Equilibria," Chemical Society Journal (London), 1949, part 3, pages 1841–1847.

OSCAR R. VERTIZ, *Primary Examiner.*

O. F. CRUTCHFIELD, *Assistant Examiner.*